W. M. WATKINS.
STABLE SCUTTLES AND TRAPS.
No. 192,722.                         Patented July 3, 1877.
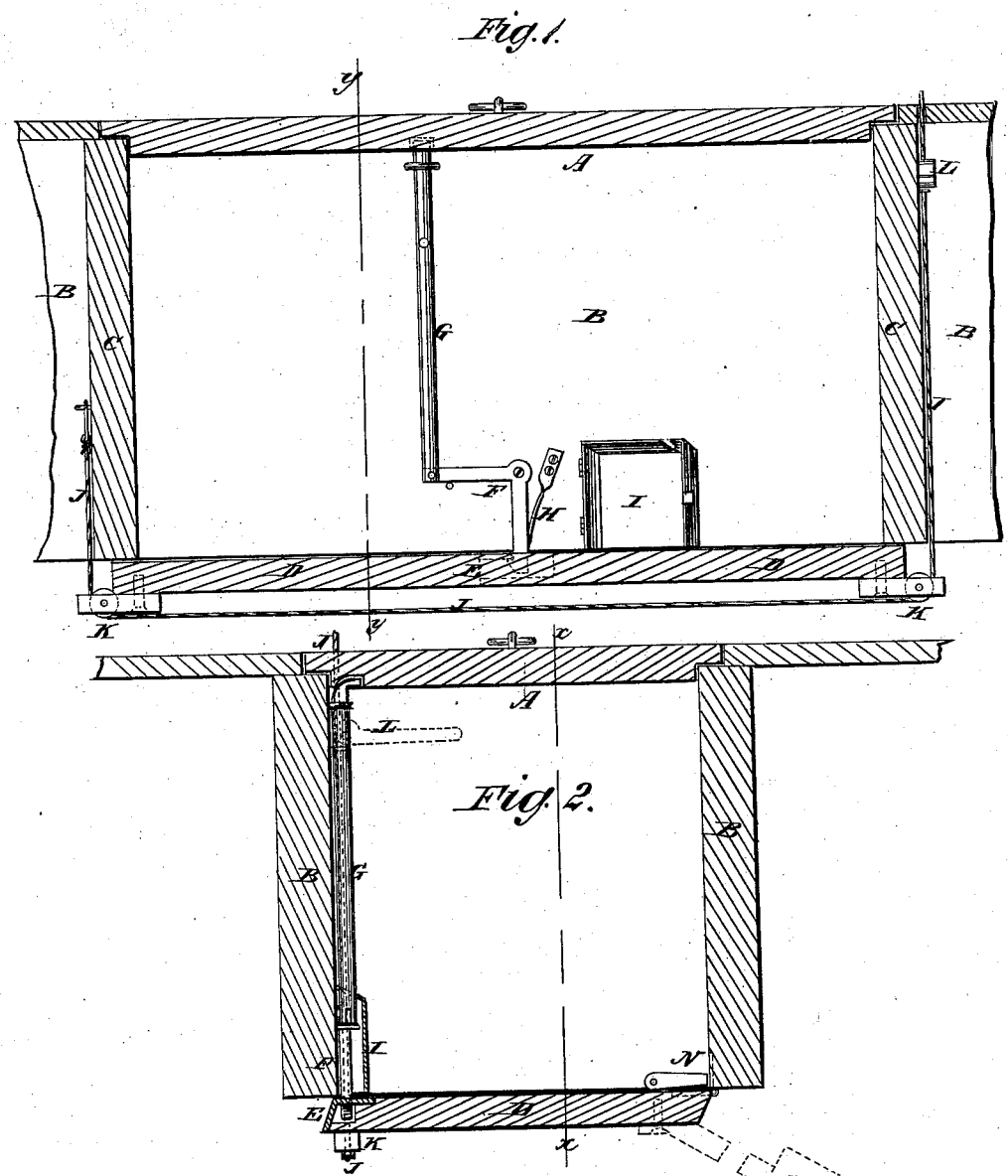

UNITED STATES PATENT OFFICE.

WILLIAM M. WATKINS, OF WORCESTER, MASSACHUSETTS.

IMPROVEMENT IN STABLE SCUTTLES AND TRAPS.

Specification forming part of Letters Patent No. 192,722, dated July 3, 1877; application filed May 12, 1877.

*To all whom it may concern:*

Be it known that I, WILLIAM M. WATKINS, of Worcester, in the county of Worcester and State of Massachusetts, have invented a new and useful Improvement in Stable Scuttle and Trap, of which the following is a specification:

Figure 1 is a vertical longitudinal section of my improved scuttle and trap, taken through the line $x\ x$, Fig. 2. Fig. 2 is a vertical cross-section of the same, taken through the line $y\ y$, Fig. 1.

Similar letters of reference indicate corresponding parts.

The invention will first be described in connection with the drawing, and then pointed out in the claims.

A is the scuttle-lid, resting on sides B and ends C, so that the whole forms a box. Hinged to a side, B, is the bottom or trap-door D, having the catch E, that receives a pivoted and right-angled latch, F. To the latch F is pivoted the lower end of rod G, which passes through keepers attached to side B, and is used to trip the said latch, which is held forward to engage with catch E when the trap-door is raised into place. The spring H is attached to side B, and bears against latch F, being both covered by a dust-case, I. The trap-door D is raised by a cord, J, fastened to ends C C, and passing over pulleys K pivoted to the forward corners of the free edge of the trap-door, a lever-cam, L, being employed to hold the free end of cord detachably.

Having thus described all that is necessary to a full understanding of my invention, what I claim is—

1. The box B C, having the hinged trap D, catch E, latch F, rod G, and spring H, arranged as shown and described.

2. The combination, with trap-door D, of the cord J and pivoted pulleys K on forward corners of said door, as and for the purpose specified.

WILLIAM M. WATKINS.

Witnesses:
   CHAS. H. PECK,
   S. E. COMBS.